United States Patent
Wu

(10) Patent No.: US 7,061,756 B2
(45) Date of Patent: Jun. 13, 2006

(54) DRIVE BRACKET WITH LOCKING DEVICES

(75) Inventor: Pin-Shian Wu, Tu-Chen (TW)

(73) Assignees: Hong Pu Jin Precision IND(Shenzhen) Co., Ltd., Shenzhen (CN); Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/920,478

(22) Filed: Aug. 17, 2004

(65) Prior Publication Data
US 2005/0047078 A1    Mar. 3, 2005

(30) Foreign Application Priority Data
Aug. 27, 2003   (TW)   ............................... 92215478 U

(51) Int. Cl.
*G06F 1/16*    (2006.01)
(52) U.S. Cl. ................. 361/685; 360/97.01; 312/223.3
(58) Field of Classification Search ................ 369/292; 360/97.01, 98.01; 312/223.2–223.3; 361/679–687, 361/724–727

See application file for complete search history.

(56) References Cited

U.S. PATENT DOCUMENTS

| | | | |
|---|---|---|---|
| 6,798,652 B1 * | 9/2004 | Wang et al. | 361/685 |
| 2004/0213141 A1 * | 10/2004 | Lin | 369/292 |
| 2005/0099767 A1 * | 5/2005 | Wu | 361/685 |

FOREIGN PATENT DOCUMENTS

| | | |
|---|---|---|
| TW | 190919 | 5/1992 |
| TW | 211361 | 8/1993 |
| TW | 224797 | 6/1994 |

\* cited by examiner

*Primary Examiner*—Hung Van Duong
(74) *Attorney, Agent, or Firm*—Wei Te Chung

(57) ABSTRACT

A drive bracket (30) includes a first latch member (40) and a second latch member (50) to secure a number of data storage devices (10) therein. The first latch member is movably attached to a side panel (33) of bracket via a spring (60). The second latch member comprises a pair of stops (56). The stop comprises a pair of slopes (563, 564) and a pair of vertical locating boards (565). The second latch member is adjustably attached to the first locking member. The data storage device with studs (15) installed in one sidewall thereof is slideably installed in the bracket. The studs switchably ride over the corresponding slopes and are blocked by the vertical boards of the second latch member to secure the data storage devices in the bracket in different positions.

18 Claims, 9 Drawing Sheets

DRIVE BRACKET WITH LOCKING DEVICES

BACKGROUND OF THE INVENTION

1. Field of the Invention

The present invention relates to a drive bracket, and particularly to a drive bracket having a locking device which readily secures data storage devices in the drive bracket in any desired positions and allows convenient removal of the data storage devices therefrom.

2. Description of the Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. Examples are disclosed in Taiwan Patent Application Nos. 82202124, 81207129 and 82207667. Fixing a data storage device to a drive bracket with bolts is unduly laborious and time-consuming. Furthermore, the computer enclosure needs extra operating space for carrying out the fixing operation. Fixing a data storage device in a drive bracket using rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance because of the plastic rails easily wearing out and needing replacement.

Thus an improved drive bracket which overcomes the above-mentioned problems is desired.

SUMMARY OF THE INVENTION

Accordingly, an object of the present invention is to provide a drive bracket which readily and conveniently secure data storage devices in any desired positions therein and which allows ready detachment therefrom.

To achieve the above-mentioned object, a drive bracket of a preferred embodiment of the present invention comprises a first latch member and a second latch member to secure a number of data storage devices therein. The first latch member is movably attached to a side panel of bracket via a spring. The second latch member comprises a pair of stops. The stop comprises a pair of slopes and a pair of vertical locating boards. The second latch member is adjustably attached to the first locking member. The data storage device with studs installed in one sidewall thereof is slideably installed in the bracket. The studs switchably ride over the corresponding slopes and are blocked by the vertical boards of the second latch member to secure the data storage devices in the bracket in different positions.

Other objects, advantages and novel features of the present invention will be drawn from the following detailed description of a preferred embodiment of the present invention with attached drawings, in which:

DETAILED DESCRIPTION OF THE INVENTION

Figure 1:
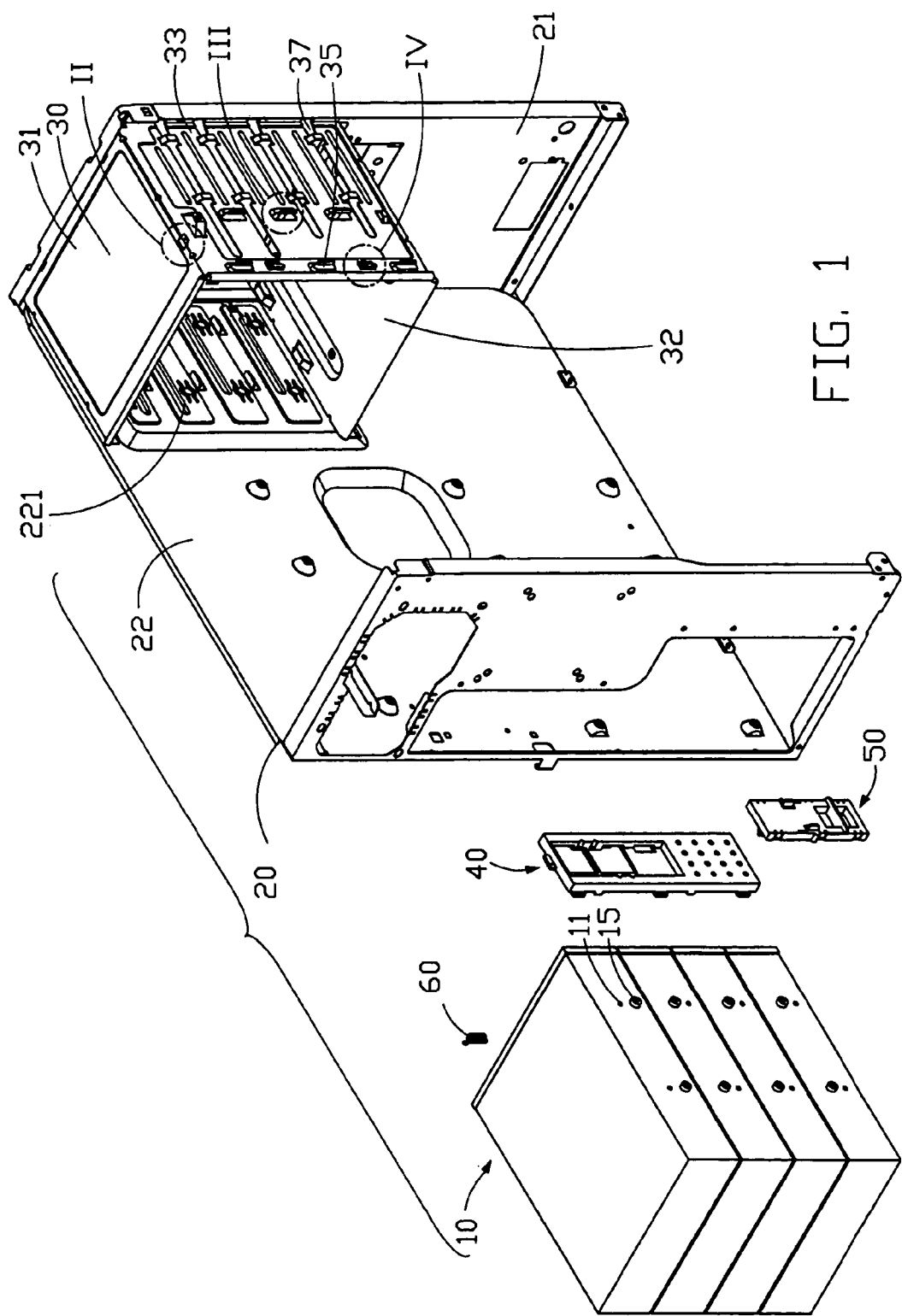
FIG. 1 is an exploded, isometric view of a drive bracket with a first latch member and a second latch member in accordance with the preferred embodiment of present invention, together with a cage, a plurality of data storage devices, a resilient member.

Referring to FIG. 1, a drive bracket 30 in accordance with the preferred embodiment of the present invention is used to accommodate a plurality of data storage devices 10 therein. A first latch member 40 movably attached to the bracket 30 via a coil spring 60 and a second latch member 50 adjustably attached to the first latch member 40 are used to secure the data storage devices 10 in any desired positions of the drive bracket 30. The drive bracket 30 is installed in a computer cage 20.

The cage 20 comprises a front plate 21, and a side plate 22. An opening (not labeled) is defined in the front plate 21. A plurality of supporting flanges 221 extends inwardly from the side plate 22, for supporting the corresponding data storage devices 10.

Each of the data storage devices 10 defines at least one pair of screw holes 11 in a sidewall thereof, for engagingly receiving studs 15 therein.

Figure 2:
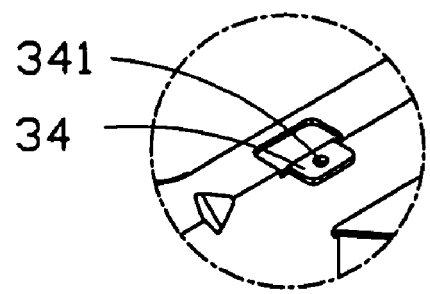
FIG. 2 is an enlarged view of a circled portion II of FIG. 1.
Figure 3:
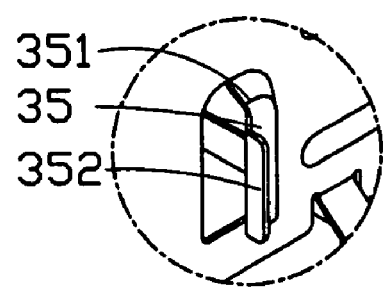
FIG. 3 is an enlarged view of a circled portion III of FIG. 1.
Figure 4:
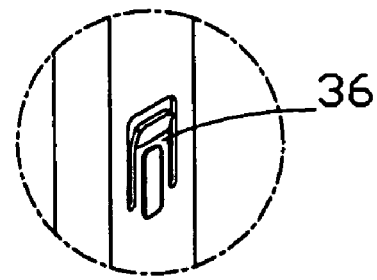
FIG. 4 is an enlarged view of a circled portion IV of FIG. 1.

The bracket 30 is configured to be attached in the cage 20. The bracket 30 comprises a top panel 31, a bottom panel 32, and a side panel 33 disposed between the top panel 31 and the bottom panel 32. Referring to FIG. 2, an ear 34 extends horizontally outwardly from a top edge of the side panel 33 of the bracket 30. A first connecting hole 341 is defined in the ear 34. A plurality of holding portions 35 arranged in two lines is stamped outwardly from the side panel 33. Referring to FIG. 3, each of the holding portions 35 comprises a domed coping 351 at a top end thereof, and a holding bar 352 extending outwardly from a free vertical edge thereof. Referring also to FIG. 4, a plurality of resilient tabs 36 is formed in the side panel 33 via stamping between the rearmost line of the holding portions 35. A plurality of sliding slots 37 is defined horizontally in the side panel 33.

Figure 5:
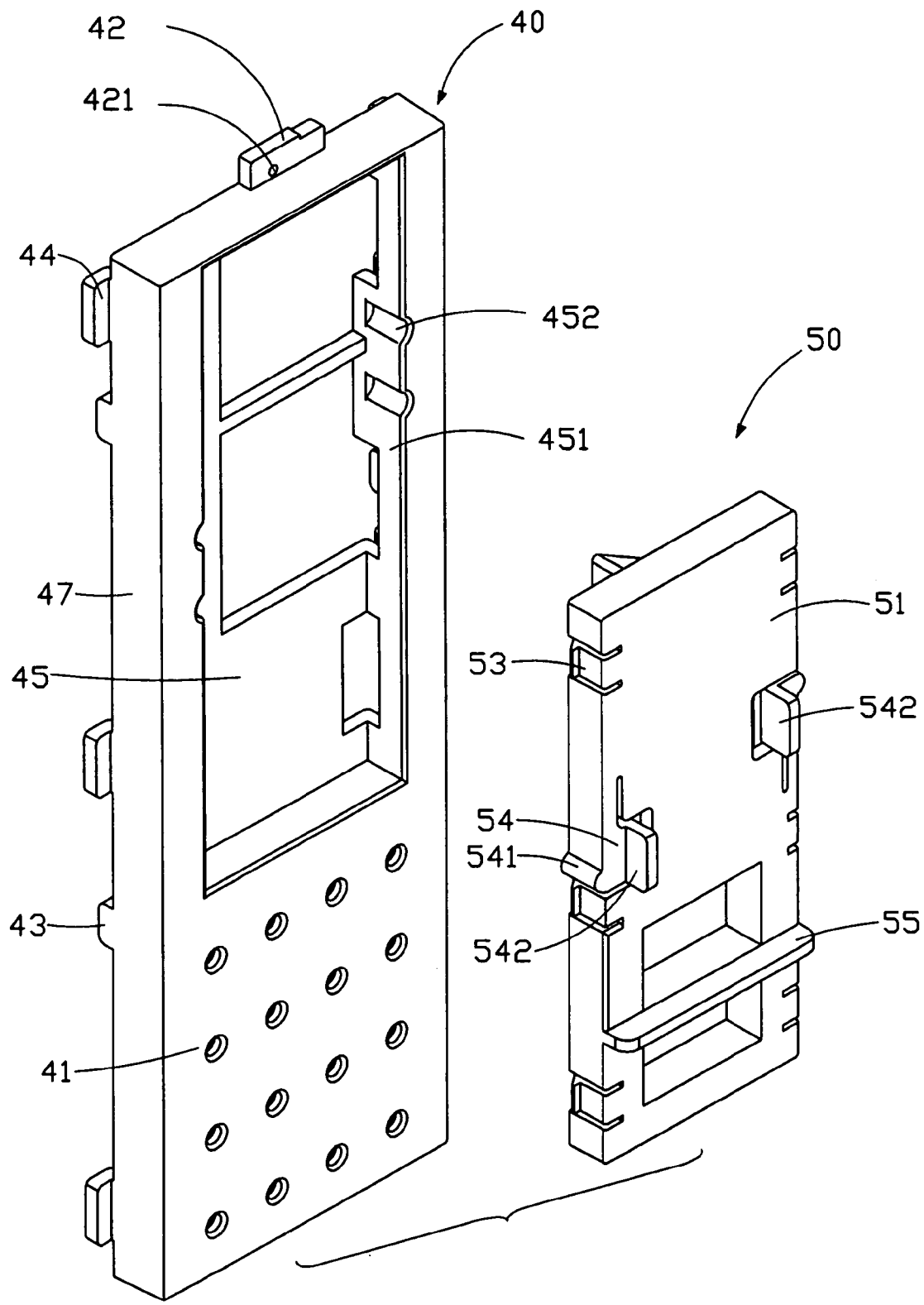
FIG. 5 is an enlarged view of the first and the second latch member of FIG. 1.
Figure 6:
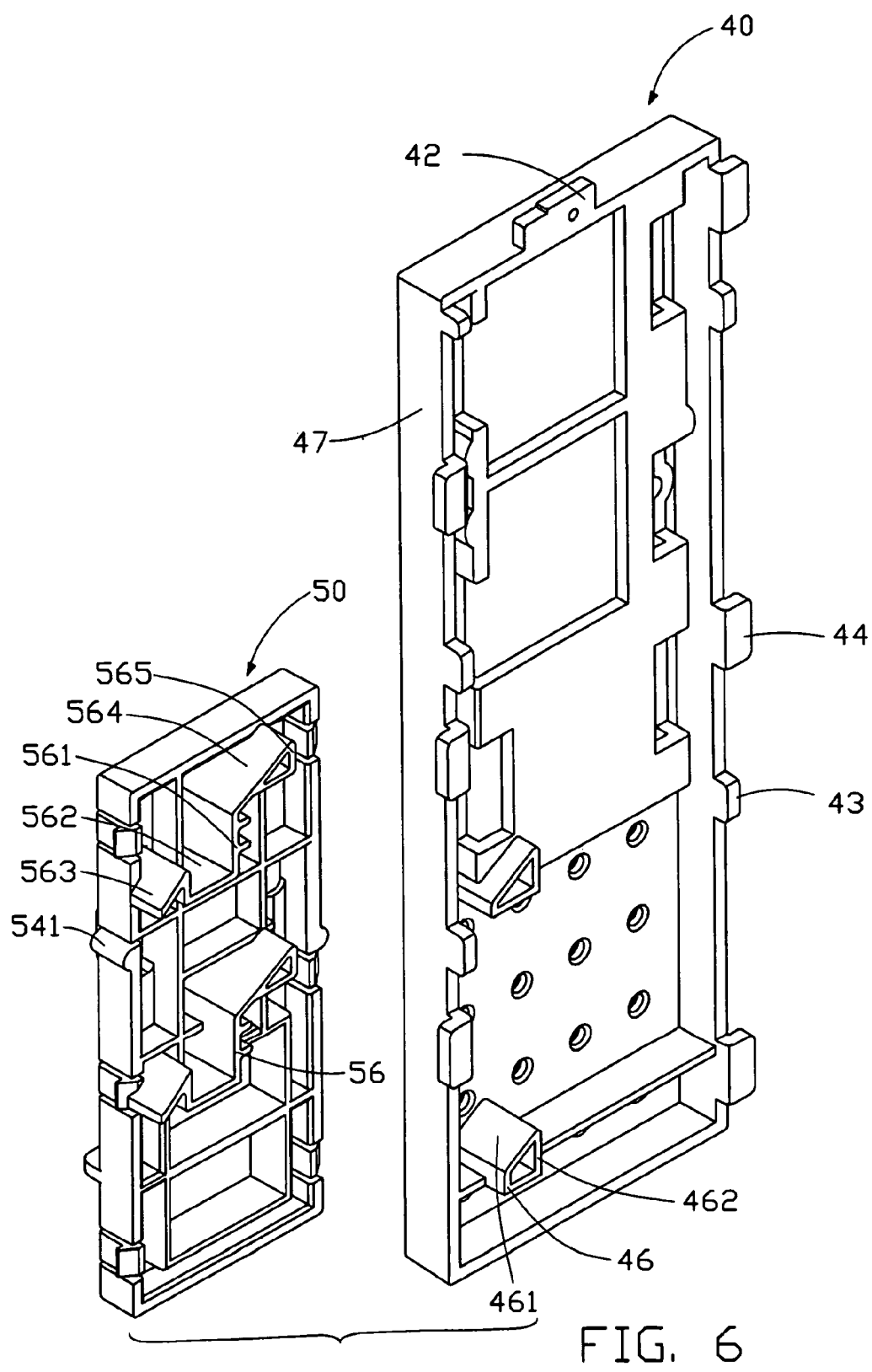
FIG. 6 is similar to FIG. 5, but viewed from another aspect.

Referring also to FIGS. 5 and 6, the first latch member 40 comprises a generally rectangular first main body 41. An upright block 42 extends from a top wall of the first main body 41. A second connecting hole 421 is defined in the block 42. The first main body 41 defines a recess 45 in an upper middle portion thereof, and forms a pair of opposite inner walls 451 at both vertical sides of the recess 45. Two pairs of arcuate dents 452 are defined in the inner walls 451, one pair above another pair. A plurality of supporting blocks 43 and catches 44 are separately formed from sidewalls 47 of the first main body 41. The catches 44 are arranged for engaging with the holding portions 35 of the bracket 30.

The second latch member 50 comprises a second main body 51 configured to be fittingly received in the recess 45 of the first latch member 40. An operating beam 55 extends from a lower portion of the second main body 51. A pair of opposite inverted resilient arms 54 is formed in the middle of the main body 51 at opposite sides thereof. Each resilient arm 54 comprises a semi-cylindric protrusion 541 in an outer portion thereof corresponding to the dents 452 of the first latch member 40, and a handle 542 extending from an inner portion thereof. A plurality of resilient hooks 53 is outwardly formed from opposite side portions of the second main body 51. A pair of stops 56 is formed inwardly from the second main body 51, one above another. Each stop 56 comprises a generally U-shaped frame 561 defining a locating space 562 therein. A first slope 563 and a second slope 564 are respectively formed from top edges of the frame 561, with the second slope 564 higher than the first slope 563. A second locating board 565 depends from the second slope 564.

Figure 7:
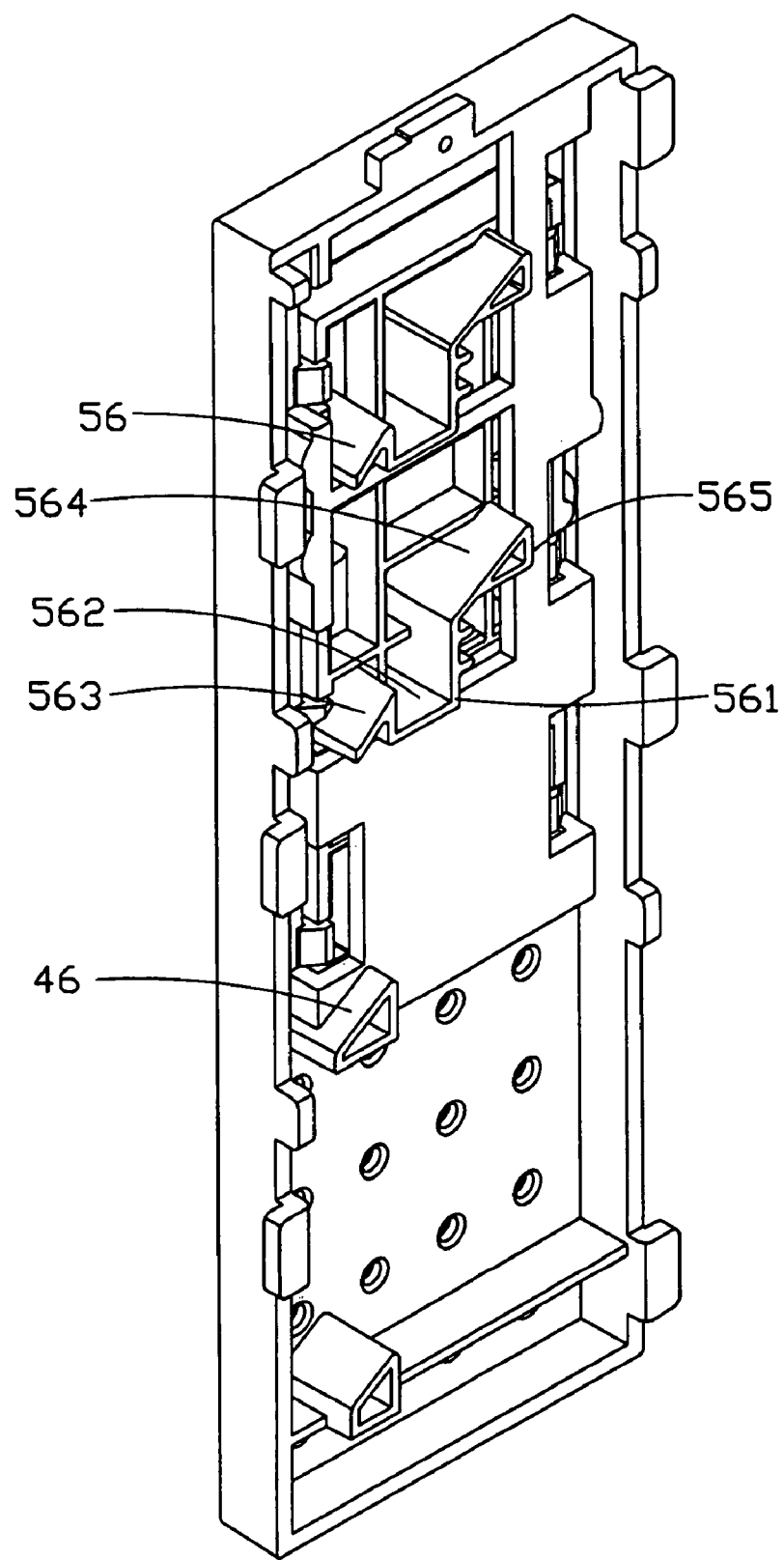
FIG. 7 is an assembled view of the first latch member, and the second latch member of FIG. 6.

Referring also to FIG. 7, in assembling the second latch member 50 to the first latch member 40, the second latch member 50 is received in the recess 45 of the first latch member 40 with the semi-cylindric protrusions 541 resiliently held in the dents 452. The resilient hooks 53 of the second latch member 50 engage with corresponding inner walls 451 of the recess 45.

Figure 8:
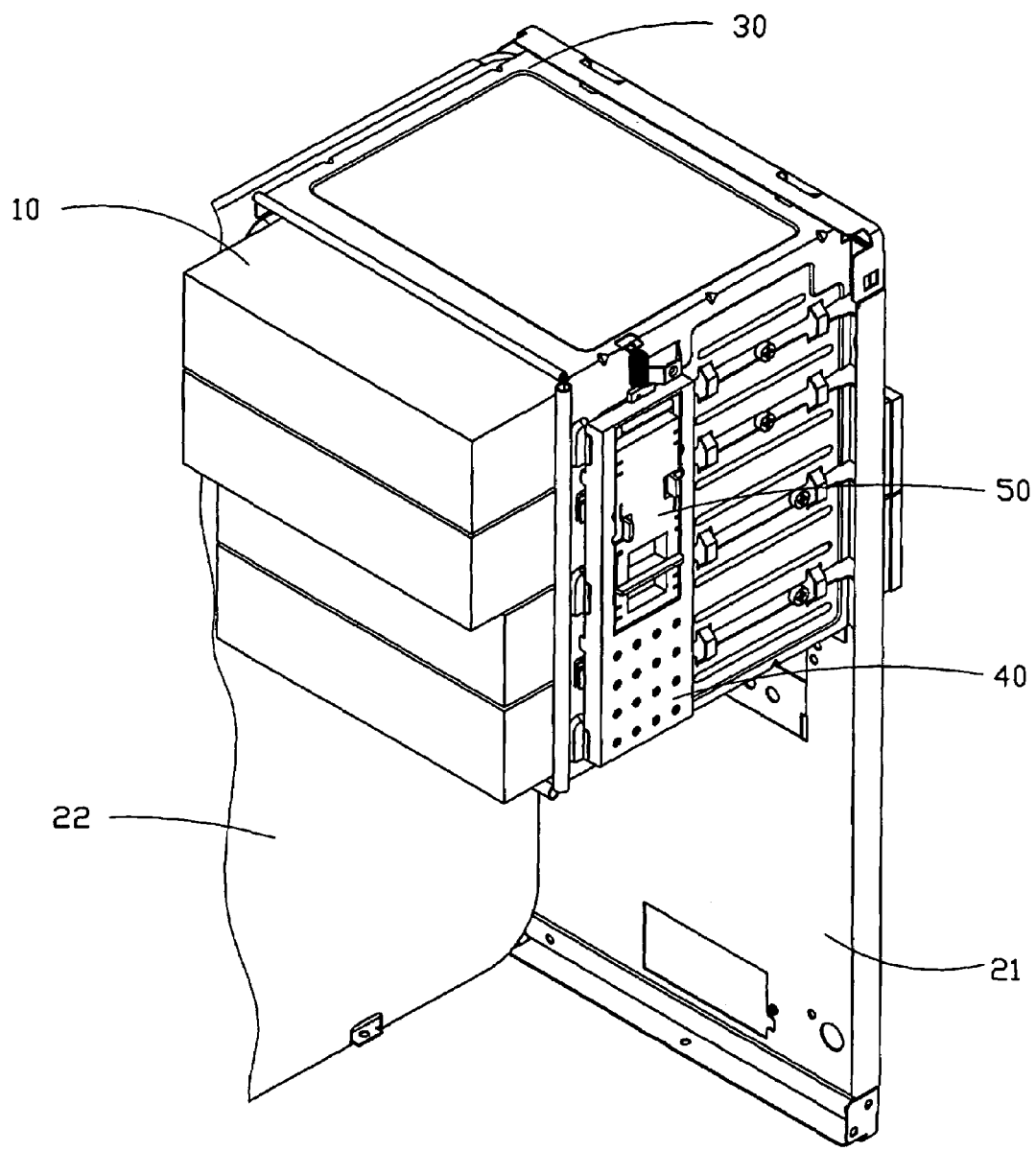
FIG. 8 is assembled view of FIG. 1, with parts of the cage cut off, and showing the data storage devices secured in the cage in a first locking position.

Referring also to FIG. 8, in assembly, the combined second latch member 50 and the first latch member 40 is then attached to the side panel 33 of bracket 30. The catches 44 of the first latch member 40 are engagingly held in the corresponding holding portions 35 of the bracket 30 and blocked by the domed copings 351 for preventing a vertical movement of the first latch member 40 relative to the bracket 30. The holding bars 352 of the holding portions 35 engagingly abut against the sidewalls 47 of the first latch member 40 for preventing a horizontal movement of the first latch member 40 relative to the bracket 30. The supporting blocks 43 of the first latch member 40 abut against an outer surface of the side panel 33 of the bracket 30, and the resilient tabs 36 abut against an inner side of the first latch member 40. Two ends of the spring 60 engage in the second connecting hole 421 of the first latch member 40 and the first connecting hole 341 of the bracket 30. The first latch member 40 is thus movably attached to the side panel 33 of the drive bracket 30. Then the bracket 30 is attached to the cage 20 by conventional means such as screws.

Figure 9:
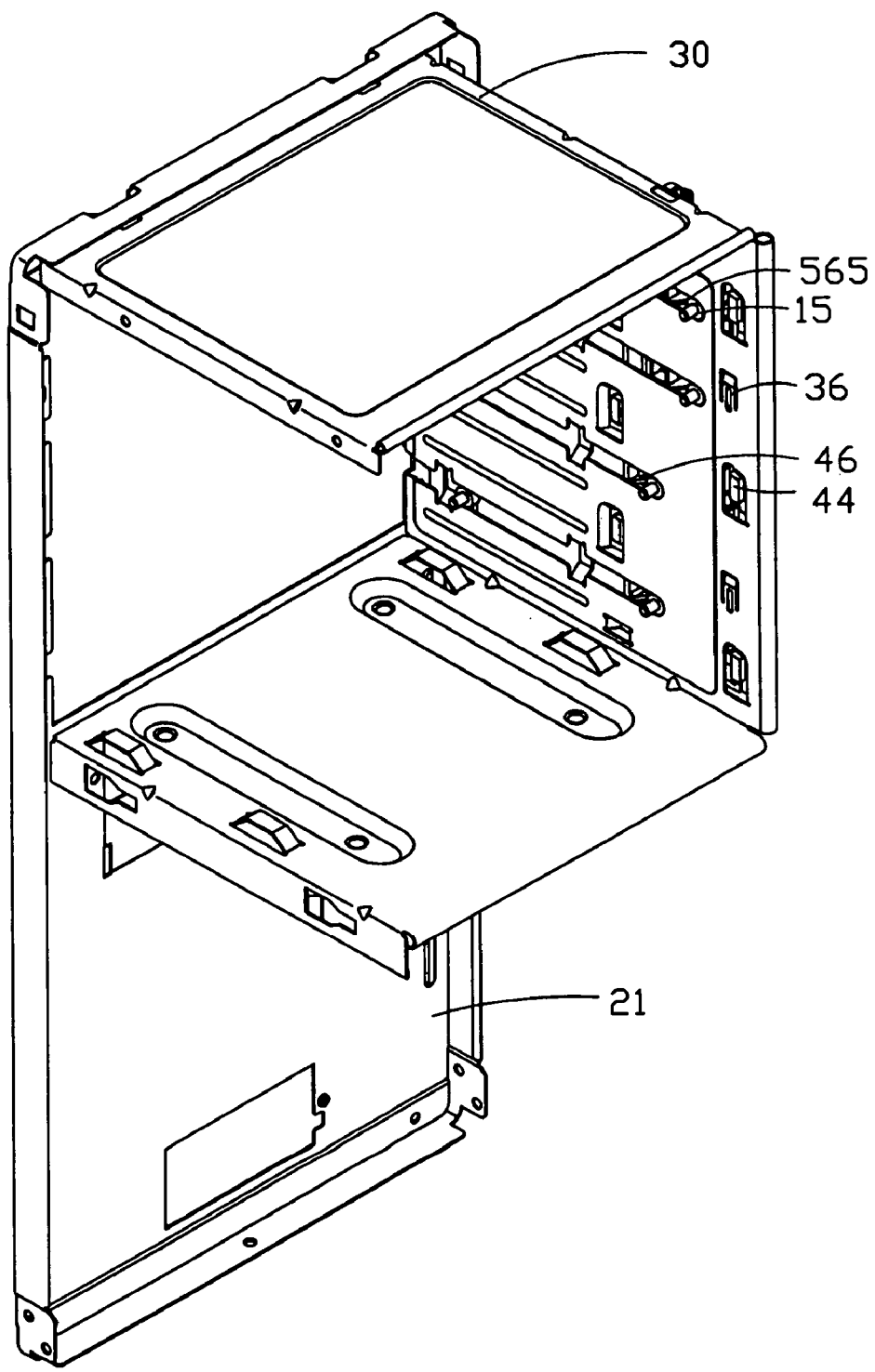
FIG. 9 is similar to FIG. 8, with the data storage devices and a side panel of the bracket being removed.

The data storage devices 10 are slid into the drive bracket 30 in a front-to-rear direction. In this embodiment, only two upper data storage devices are adjustable between a first locking position and a second locking position. FIGS. 8 and 9 show the data storage devices 10 in the first locking position. In this first position, the semi-cylindric protrusions 541 of the second latch member 50 are located in a lower pair of the dents 452 of the first latch member 40. The data storage devices 10 are supported by the supporting flanges 221. The studs 15 attached to the data storage devices 10 are slid in the slots 37 of the bracket 30. When the studs 15 of the upper data storage devices slide and exert a downward force onto the second slope 561 of the stops 56, the spring 60 is lengthen in a result of the combined first and second latch members 40, 50 moved downwardly along the holding portions 35 of the bracket 30. When the studs 15 ride over topmost edges of the second slope 561, the spring 60 rebounds, and the studs 15 are located between the second locating boards 565 and rear ends of the corresponding slots 37 of the bracket 30. The two upper data storage devices 10 are thus secured in the cage 20 in the first locking position.

Figure 10:
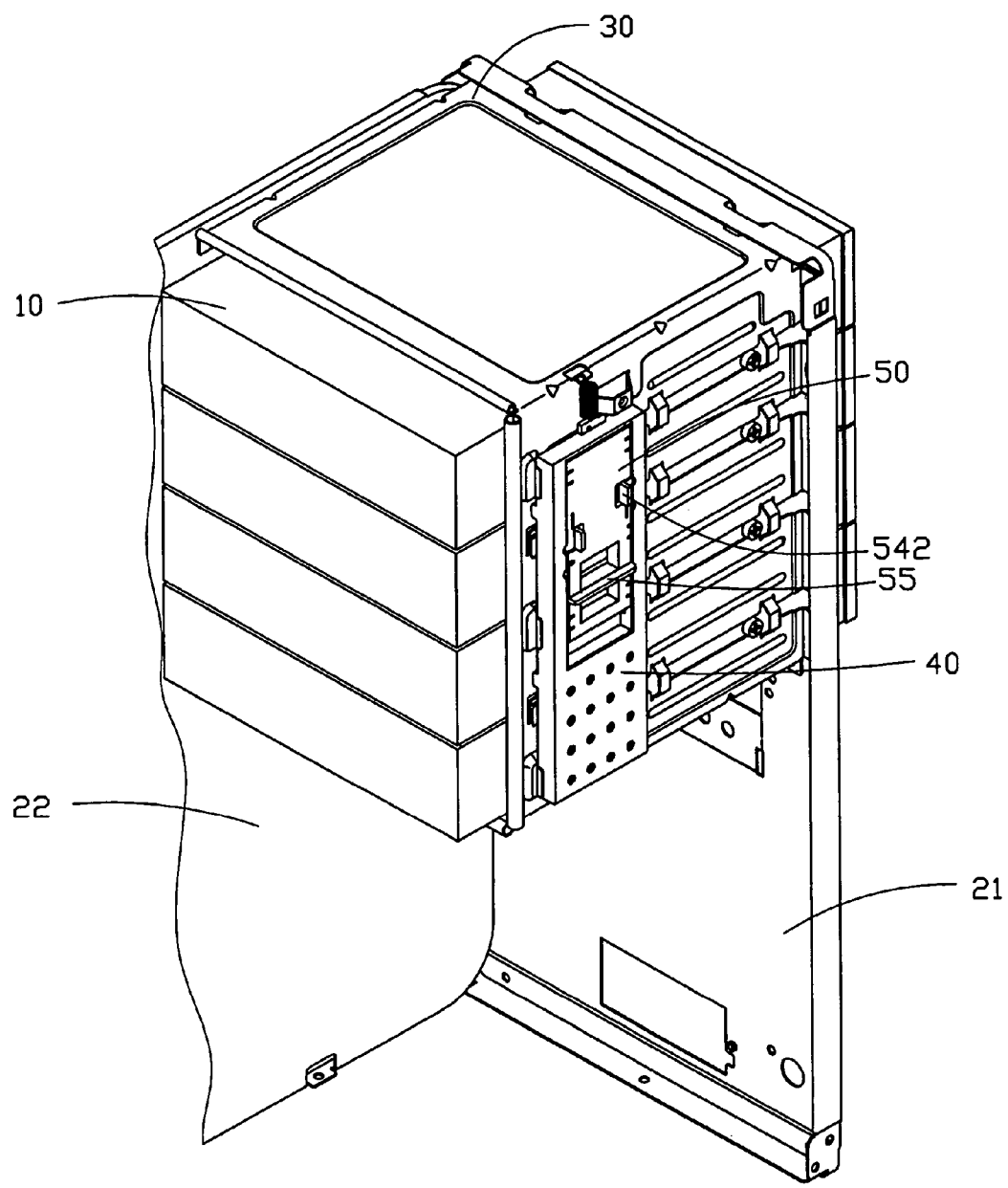
FIG. 10 is an assembled view of the mounting apparatus of FIG. 1, with parts of the cage cut off, and showing the data storage devices secured in the bracket in a second locking position.
Figure 11:
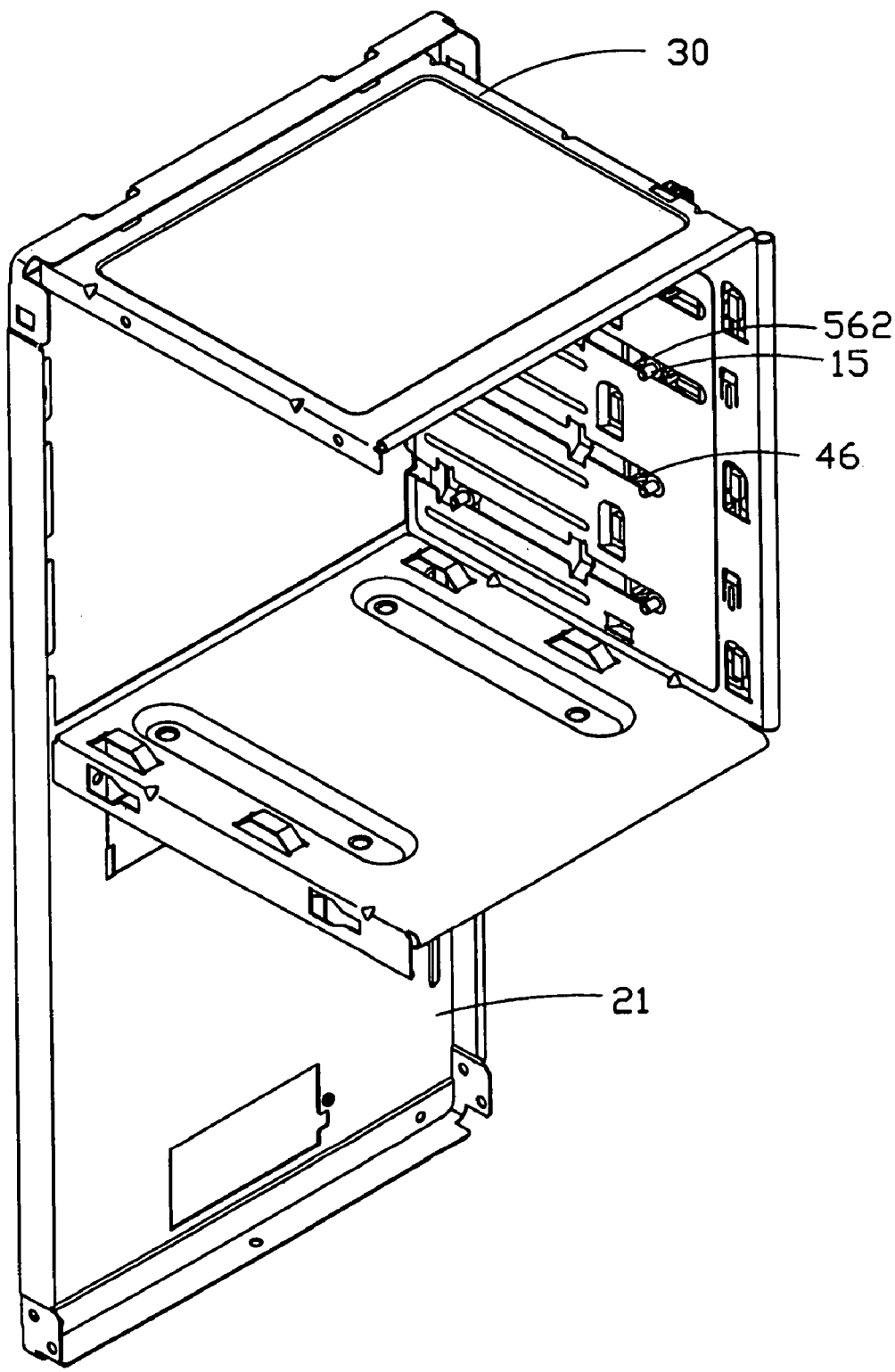
FIG. 11 is similar to FIG. 10, with the data storage devices and a side panel of the bracket being removed.

Referring also to FIGS. 10 and 11, the two upper data storage devices 10 are in a second locking position. In this second position, the handles 542 of the second latch member 50 are squeezed toward each other and then pushed upwardly, thus the semi-cylindric protrusions 541 are withdrawn from the corresponding dents 452 and are moved to locate in an upper pair of the dents 452 of the first latch member 40. When the studs 15 slide into the slots 37, and exert a downward force onto the first slope 563 of the stop 56, the spring 60 is lengthen in a result of the combined first and second latch member 40, 50 moved downwardly along the holding portions 35 of the bracket 30. The studs 15 ride over topmost edges of the first slopes 563 and fall into the locating spaces 562 of the stops 56, the spring 60 rebounds. The data storage devices 10 are thus secured in the drive bracket 30 in the second locking position.

In this preferred embodiment of the present invention, there are another two stops 46 inwardly formed from the first main body 41 below the recess 45, with one above another. Each stop 46 is generally a triangle, and comprises a slanting board 461 and a vertical locating board 462. The studs 15 of the two lower data storage devices 10 ride over the slanting boards 461, and are blocked by the vertical locating board 462, thereby the lower data storage devices 10 are secured in the drive bracket 30.

In disassembly, the operating beam 55 of the second latch member 50 is depressed so that the first latch member 40 is accordingly moved downwardly, and the spring 60 is lengthen. Then the studs 15 are released from the locating space 562 defined in the frame 561 in the second locking position, or a locating space defined between the locating board 565 and a rear end of the corresponding slots 30 in the first locking position. The data storage devices 10 are thereby freely drawn out from the bracket 30.

According to the number of the data storage devices 10 desired, the number of the stops 47, the slopes 563, 564, and the dents 452 can all be configured accordingly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

What is claimed is:

1. A bracket for accommodating a data storage device with at least one stud fixed in a sidewall thereof, the bracket comprising:
   a side panel;
   a first latch member vertically movably attached to the side panel via a resilient member; and
   a second latch member adjustably attached to the first latch member, the second latch member comprising at least one stop engaging with said stud;
   when the data storage device is inserted into the bracket, said stud drives the first and second latch member to move in a vertical direction with deformation of the resilient member, after said stud rides over the at least one stop, said stud is blocked by the at least one stop, the data storage device is thereby locked in the bracket.

2. The bracket as described in claim 1, wherein the side panel comprises at least one pair of holding portions, the first latch member forms at least one pair of catches to movably engage with said holding portions.

3. The bracket as described in claim 1, wherein the side panel further comprises a plurality of resilient tabs to abut against an inner side of the first latch member.

4. The bracket as described in claim 1, wherein the first latch member comprises a plurality of supporting blocks to abut against the side panel.

5. The bracket as described in claim 1, wherein the side panel of the bracket has an ear extending outwardly from an upper portion thereof and defining a first connecting hole, the first latch member forms a block at an upper portion thereof and defining a second connecting hole, the resilient member has two ends respectively engaging in the first connecting hole and the second connecting hole.

6. The bracket as described in claim 1, wherein the first latch member defines a recess to accommodate the second latch member, the second latch member comprises a plurality of hooks to engage with the first latch member.

7. The bracket as described in claim 2, wherein each of said holding portions comprises a holding bar to limit a front-to-back movement of the first latch member, and a coping to limit a left-to-right movement of the first latch member.

8. The bracket as described in claim 6, wherein inner walls of the recess defines two pairs of dents with one pair above another pair, the second latch member comprises a pair of resilient arms having protrusions to switchably engage with one pair of the dents.

9. The bracket as described in claim 8, wherein said stop comprises two slopes and two locating boards depending from top portions of the slopes respectively, one of the slopes in front of and above the other one.

10. The mounting apparatus as described in claim 8, wherein each of the resilient arms comprises a handle.

11. A bracket assembly comprising:
a data storage device having a stud fixed in a sidewall thereof;
a bracket receiving the data storage device, the bracket comprising a side panel defining a slot for the stud to slide therein;
a first latch member vertically movably attached to said side panel via a resilient member, the first latch member defining a void therein and forming two walls, at least two pairs of dents defined in the walls, with one pair above another;
a second latch member received in the void of the first latch member, the second latch member comprising a pair of protrusions resiliently held in one pair of the dents, and at least one stop having two slopes and two vertical boards receptively depending from top portions of the slopes, one of the slopes locating in front of and above the other one;
wherein the second latch member is attached to the first latch member at different vertical positions with the protrusions engaging in different pairs of dents, the data storage device is slid in the bracket, the stud rides over different slopes of the stop of the second latch member leading to deformation of the resilient member, and is then blocked by a corresponding vertical board, the data storage device is thereby locked in the bracket.

12. The bracket assembly as described in claim 11, wherein the side panel of the bracket forms an ear, a first hole is defined in the ear, the first latch member defining a second hole, the resilient member is disposed between the first hole and the second hole.

13. The bracket assembly as described in claim 11, wherein the second latch member further comprise a pair of resilient arms each of which having a handle, each of the protrusions is extended from an outer side of a corresponding resilient arm.

14. A bracket assembly comprising:
a data storage device having a stud protruding out of a sidewall thereof in a lateral direction;
a bracket receiving the data storage device along a front-to-back direction perpendicular to the lateral direction, the bracket comprising a side panel defining a slot in which the stud is slidably received;
a first member located by said side panel and vertically movable thereto via a resilient member; and
a second member being capable of selectively located at first and second positions relative to the first member, at least one stopper set located on the second member;
when said data storage device is of a first type, the second member is selectively located to the first position to have the at least one stopper set lock the corresponding stud; when said data storage is of a second type longer than the first type in said front-to-back direction, the second member is selectively located to the second position to have the at least one stopper set lock the corresponding stud.

15. The bracket assembly as claimed in claim 14, wherein the at least one stopper set includes two stoppers for respective engagement with the corresponding studs of the first type data storage and the second type data storage when said second member is selectively located in the first and second positions, and the first and second positions are spaced from each other in a vertical direction.

16. The bracket assembly as claimed in claim 15, wherein said two stoppers are spaced from each other in both the vertical direction and the front-to-back direction.

17. A bracket assembly comprising:
a data storage device having a stud protruding out of a sidewall thereof in a lateral direction;
a bracket receiving the data storage device along a front-to-back direction perpendicular to the lateral direction, the bracket comprising a side panel defining a slot in which the stud is slidably received;
a first member located by said side panel and vertically movable thereto via a resilient member; and
a second member associated with the first member with thereon first and second stoppers spaced from each other in at least along a front-to-back direction;
when said data storage device is of a first type, the first stopper locks the corresponding stud; when said data storage is of a second type longer than the first type in said front-to-back direction, the second stopper locks the corresponding stud.

18. The bracket assembly as claimed in claim 17, wherein said second member is vertically locatable relative to the first member in a vertical direction perpendicular to said front-to-back direction, and said first stopper is spaced from the second stopper not only in the front-to-back direction but also the vertical direction.

* * * * *